US009225030B1

(12) United States Patent
Huang et al.

(10) Patent No.: US 9,225,030 B1
(45) Date of Patent: Dec. 29, 2015

(54) MIXED PROTON AND CARBONATE ION CONDUCTOR

(75) Inventors: Kevin Huang, Export, PA (US); Xue Li, Columbia, SC (US)

(73) Assignee: University of South Carolina, Columbia, SC (US)

( * ) Notice: Subject to any disclaimer, the term of this patent is extended or adjusted under 35 U.S.C. 154(b) by 0 days.

(21) Appl. No.: 13/528,799

(22) Filed: Jun. 20, 2012

Related U.S. Application Data

(60) Provisional application No. 61/571,059, filed on Jun. 20, 2011.

(51) Int. Cl.
*H01M 8/14* (2006.01)
*H01M 8/12* (2006.01)
*H01M 8/10* (2006.01)

(52) U.S. Cl.
CPC ............... *H01M 8/146* (2013.01); *H01M 8/10* (2013.01); *H01M 8/12* (2013.01); *H01M 8/124* (2013.01); *H01M 8/1246* (2013.01); *H01M 8/1253* (2013.01); *H01M 8/144* (2013.01); *H01M 8/145* (2013.01); *H01M 2008/1293* (2013.01); *H01M 2008/147* (2013.01)

(58) Field of Classification Search
CPC ......... H01M 8/10; H01M 8/12; H01M 8/124; H01M 8/1246; H01M 8/1253; H01M 2008/1293; H01M 8/144–8/146; H01M 2008/147
USPC .......... 429/400–535, 472, 495, 496, 477, 478
See application file for complete search history.

(56) References Cited

U.S. PATENT DOCUMENTS

| | | | | | |
|---|---|---|---|---|---|
| 3,953,237 | A | * | 4/1976 | Epstein et al. | 429/478 |
| 4,895,774 | A | * | 1/1990 | Ohzu et al. | 429/478 |
| 6,190,519 | B1 | * | 2/2001 | Kobayashi et al. | 204/426 |
| 7,198,864 | B2 | * | 4/2007 | Ohlsen | 429/532 |
| 7,318,982 | B2 | * | 1/2008 | Gozdz et al. | 429/213 |
| 2002/0106549 | A1 | * | 8/2002 | Cooper et al. | 429/40 |
| 2005/0277015 | A1 | * | 12/2005 | Xu et al. | 429/40 |
| 2006/0257721 | A1 | * | 11/2006 | Xu et al. | 429/46 |
| 2008/0311455 | A1 | * | 12/2008 | Shim et al. | 429/30 |
| 2011/0262839 | A1 | * | 10/2011 | Kang et al. | 429/496 |
| 2012/0060910 | A1 | * | 3/2012 | Schoenfeld et al. | 136/256 |
| 2012/0088180 | A1 | * | 4/2012 | Heo et al. | 429/481 |

OTHER PUBLICATIONS

Babilo et al., "Enhanced Sintering of Yttrium-Doped Barium Zirconate by Addition of ZnO", Journal of the American Ceramic Society, vol. 88, No. 9, 2005, pp. 2362-2368.
Babilo et al., "Processing of Yttrium-Doped Barium Zirconate for High Proton Conductivity", Journal of Materials Research, vol. 22, No. 5, May 2007, pp. 1322-1330.

(Continued)

*Primary Examiner* — Milton I Cano
*Assistant Examiner* — Ling R Zeng
(74) *Attorney, Agent, or Firm* — Dority & Manning, P.A.

(57) ABSTRACT

The present disclosure relates to a solid oxide fuel cell. The solid oxide fuel cell includes an electrolyte comprising a mixed proton and carbonate ion conductor. The mixed proton and carbonate ion conductor includes a proton conducting ceramic impregnated with impregnated with a molten carbonate.

10 Claims, 3 Drawing Sheets

(56) References Cited

OTHER PUBLICATIONS

Bohn et al., "Electrical Conductivity of the High-Temperature Proton Conductor $BaZr_{0.9}Y_{0.1}O_{2.95}$", Journal of the American Ceramic Society, vol. 83, Issue 4, Apr. 2000, pp. 768-772.

Bozza et al., "High Performance Anode-Supported Intermediate Temperature Solid Oxide Fuel Cells (IT-SOFCs) with $La_{0.8}Sr_{0.2}Ga_{0.8}Mg_{0.2}O_{3-\delta}$ Electrolyte Films Prepared by Electrophoretic Deposition", Electrochemistry Communications, vol. 11, Issue 9, Aug. 2009, pp. 1680-1683.

De Souza et al., "Thin-Film Solid Oxide Fuel Cell with High Performance at Low-Temperature", Solid State Ionics, vol. 98, Issues 1-2, Jun. 1997, pp. 57-61.

Di et al., "Samarium Doped Ceria-$(Li/Na)_2CO_3$ Composite Electrolyte and its Electrochemical Properties in Low Temperature Solid Oxide Fuel Cell", Journal of Power Sources, vol. 195, Issue 15, Aug. 2010, pp. 4695-4699.

Duval et al., "Electrical Conductivity of the Proton Conductor $BaZr_{0.9}Y_{0.1}O_{3-\delta}$ Obtained by High Temperature Annealing", Solid State Ionics, vol. 178, Issues 25-26, Oct. 2007, pp. 1437-1441.

Fabbri et al., "Materials Challenges toward Proton-Conducting Oxide Fuel Cells: A Critical Review", Chemical Society Reviews, vol. 39, No. 11, Sep. 2010, pp. 4355-4369.

Goodenough, "Ceramic Technology: Oxide-Ion Conductors by Design", Nature, vol. 404, No. 6780, Apr. 20, 2000, pp. 821.

Iguchi et al., "The Influence of Grain Structures on the Electrical Conductivity of a $BaZr_{0.95}Y_{0.05}O_3$ Proton Conductor", Solid State Ionics, vol. 177, Issues 26-32, Oct. 2006, pp. 2381-2384.

Iwahara et al., "Protonic Conduction in Calcium, Strontium and Barium Zirconates", Solid State Ionics, vol. 61, Issues 1-3, May 1993, pp. 65-69.

Li et al., Effective Ionic Conductivity of a Novel Intermediate-Temperature Mixed Oxide-Ion and Carbonate-Ion Conductor, Journal of the Electrochemical Society, vol. 158, Issue 2, 2011, pp. B225-B232.

Li et al., "Performance of Ionic-Conducting Ceramic/Carbonate Composite Material as Solid Oxide Fuel Cell Electrolyte and $CO_2$ Permeation Membrane", Catalysis Today, vol. 148, Issues 3-4, Nov. 2009, pp. 303-309.

Magrez et al., "Preparation, Sintering, and Water Incorporation of Proton Conducting $Ba^{0.99}Zr^{0.8}Y^{0.2}O^{3-\delta}$; Comparison Between Three Different Synthesis Techniques", Solid State Ionics, vol. 175, Issues 1-4, Nov. 2004, pp. 585-588.

Tao et al., "Conductivity Studies of Dense Yttrium-Doped $BaZrO_3$ Sintered at 1325° C.", Journal of Solid State Chemistry, vol. 180, Issue 12, Dec. 2007, pp. 3493-3503.

Tong et al., "Cost-Effective Solid-State Reactive Sintering Method for High Conduct Conducting Yttrium-Doped Barium Zirconium Ceramics", Solid State Ionics, vol. 181, Issues 11-12, Apr. 2010, pp. 496-503.

Wagner, Jr., "Transport in Compounds Containing a Dispersed Second Phase", Materials Research Bulletin, vol. 15, Issue 12, Dec. 1980, pp. 1691-1701.

Wang et al., "Novel Core-Shell SDC/Amorphous $Na_2CO_3$ Nanocomposite Electrolyte for Low-Temperature SOFCs", Electrochemistry Communications, vol. 10, Issue 10, Oct. 2008, pp. 1617-1620.

Yamazaki et al., "High Total Proton Conductivity in Large-Grained Yttrium-Doped Barium Zirconate", Chemistry of Materials, vol. 21, No. 13, 2009, pp. 2755-2762.

Zhao et al., "Influence of DSPP on the Properties of AgI", Solid State Ionics, vol. 9-10, Part 2, Dec. 1983, pp. 1175-1178.

Zhu et al., "Innovative Solid Carbonate-Ceria Composite Electrolyte Fuel Cells", Electrochemistry Communications, vol. 3, No. 10, Oct. 2001, pp. 566-571.

Zhu et al., "Intermediate Temperature Fuel Cells with Electrolytes Based on Oxyacid Salts", Journal of Power Sources, vol. 52, Issue 2, Dec. 1994, pp. 289-293.

\* cited by examiner

MIXED PROTON AND CARBONATE ION CONDUCTOR

CROSS-REFERENCE TO RELATED APPLICATION

The present application is based on and claims priority to U.S. Provisional Application 61/571,059 having a filing date of Jun. 20, 2011, which is incorporated by reference herein.

BACKGROUND

Intermediate-temperature solid oxide fuel cells (IT-SOFCs) have garnered much attention in recent years due to their potential to meet cost and reliability targets required of commercial products. Two areas of interest in IT-SOFCs are reducing electrolyte thickness and/or discovering new electrolyte materials with improved ionic conductivity. In searching for new electrolyte materials, proton conducting ceramics emerge as strong electrolyte candidates for IT-SOFCs. Among these proton conductors, yttrium-doped barium zirconate (BZY) has appeal due to its high bulk proton conductivity, excellent chemical stability in $CO_2$ and good mechanical strength. However, this material is refractory and requires a very high temperature (from about 1700° C. to about 2100° C.) and a long sintering time (often greater than 24 hours), even with nanosize starting powders, to achieve a dense microstructure. Higher temperature or longer time often results in a deficiency in barium and other impurity phases, causing high grain-boundary resistance. Although the sintering temperature of BZY can be effectively reduced by adding sintering aids, e.g. NiO, ZnO, MgO, CuO, and $Sc_2O_3$, such sintering aids can lead to a lowered ionic conductivity and increased electronic conductivity, especially in reducing atmospheres.

A $Li_2CO_3$—$K_2CO_3$ eutectic mixture supported by a porous $LiAlO_2$ matrix is a standard electrolyte package for molten carbonate fuel cells (MCFCs). The pore size and porosity in the $LiAlO_2$ matrix used by the MCFC industry are carefully tailored so that the molten carbonate phase is retained within the porous $LiAlO_2$ matrix by capillary forces. The pores in $LiAlO_2$ are, therefore, filled with the molten carbonate phase, making the solid/liquid electrolyte membrane gastight.

As such, a need exists for a dense proton conductor membrane that can benefit from such a strategy. Methods of manufacturing such a membrane would also be desirable.

SUMMARY

The present disclosure relates to a solid oxide fuel cell. The solid oxide fuel cell includes an electrolyte comprising a mixed proton and carbonate ion conductor. The mixed proton and carbonate ion conductor includes a proton conducting ceramic impregnated with impregnated with a molten carbonate.

In certain embodiments of the present disclosure, a method for forming a solid oxide fuel cell is described. The method includes impregnating a proton conducting ceramic with a molten carbonate to form an electrolyte and assembling the electrolyte with an anode and a cathode.

Other features and aspects of the present invention are discussed in greater detail below.

BRIEF DESCRIPTION OF THE FIGURES

A full and enabling disclosure of the present subject matter, including the best mode thereof, to one of ordinary skill in the art, is set forth more particularly in the remainder of the specification, including reference to the accompanying figures in which.

DETAILED DESCRIPTION

Figure 1:
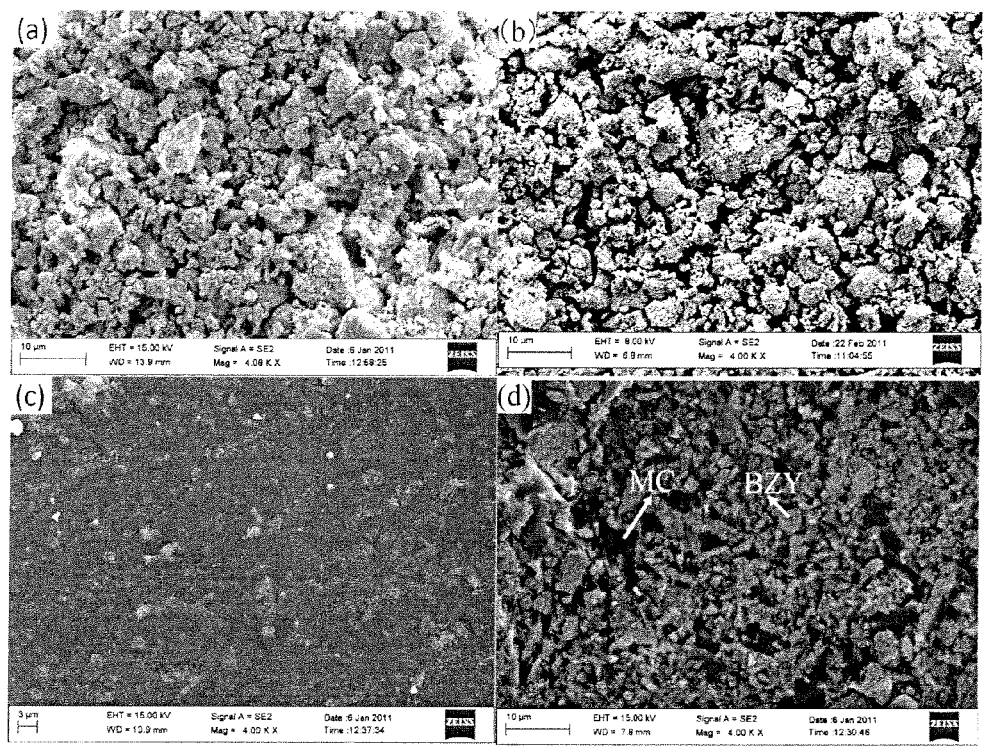
FIG. 1 illustrates SEM micrographs of (a) surface and (b) fracture of BZY sintered at 1500° C.; (c) surface and (d) fracture of MPCC fired at 600° C. in accordance with certain embodiments of the present disclosure.

Reference will now be made in detail to embodiments of the disclosed subject matter, one or more examples of which are set forth below. Each example is provided by way of explanation of the subject matter, not limitation of the subject matter. In fact, it will be apparent to those skilled in the art that various modifications and variations can be made in the present disclosure without departing from the scope or spirit of the subject matter. For instance, features illustrated or described as part of one embodiment, can be used on another embodiment to yield a still further embodiment.

In accordance with the present disclosure, a dense refractory proton conducting ceramic (such as, e.g., $BaZr_{0.8}Y_{0.2}O_{3-\delta}$, BZY) membrane is fabricated by adding a carbonate eutectic (such as, e.g., $Li_2CO_3$—$K_2CO_3$). The fabricated two-phase composite can also act as a mixed proton and carbonate ion conductor (MPCC).

It has been determined that carbonate can promote the densification and enhance the conductivity of the refractory proton conducting ceramic. In accordance with the process described herein, densification of BZY has been successfully demonstrated at temperatures lower than conventional processes, such as less than about 1000° C., in the presence of carbonate. The ionic conductivities of the carbonate-added BZY can reach about 0.33 and about 0.38 S/cm at 600° C. in 3% $H_2O$-air and in 3% $H_2O$—$H_2$, respectively. The observation of ionic conductivity increasing with $P_{H2O}$ and $P_{H2}$ suggests protons as the charge carriers. A fuel cell based on the composite electrolyte (which can be about from about 0.5 mm-1.5 mm thick, more particularly about 1 mm thick) including a $LiNiO_2$-MPCC cathode, a BZY—NiO anode blocking layer and a Ni anode, yields about 114 mW/cm² at about 670° C.

As described herein, fabrication of the dense BZY with a carbonate phase as the sintering aid can take place at reduced temperatures, such as less than 1000° C., and more particularly about 600° C. When the MPCC is in all solid-state, the conventional $H_2O(H_2)$—$V_o^{\cdot\cdot}$ interacting defect model and proton transfer from oxide to carbonate can be used to explain the observed conductivity behaviors. When the MPCC is in solid-liquid state, simultaneous proton conduction can take place in the bulk oxide and along the interface of oxide and carbonate where extensive proton exchange and transfer can occur.

The following examples are meant to illustrate the disclosure described herein and are not intended to limit the scope of this disclosure.

EXAMPLES

The solid-oxide phase $BaZr_{0.8}Y_{0.2}O_{3-\delta}$ (BZY) powder was first obtained via solid-state reaction among $BaCO_3$, $ZrO_2$ and $Y_2O_3$ at 1300° C. for 5 h. The pre-reacted powders were then pelletized and sintered at 1500° C. for 5 h. The resultant BZY pellets are porous in microstructure, which allows for impregnation with $(Li_{0.62}K_{0.38})_2CO_3$ (molten carbonate, MC) at 600° C. for 2 h. The phase purity and microstructural features of the samples were examined with Rigaku D/max-A X-ray diffractometer (XRD) using Cu Kα radiation and Zeiss Ultra plus FE-SEM, respectively.

All electrochemical characterizations were performed from about 400° C. to about 650° C. on symmetrical cell constructed of a MPCC and Ag electrode as described in X. Li, G. Xiao, K. Huang, J. Electrochem. Soc. 158 (2011) B225, incorporated by reference herein. To investigate the effect of $H_2O$ partial pressure ($P_{H_2O}$) on the ionic conductivity, a range of steam contents (0-30%) were varied by passing the carrier gas, air or $H_2$, through a water saturator at a fixed temperature. An on-line humidity sensor (Vaisala model 332) was used to measure the real steam content in the carrier gas. All gas lines were heat-wrapped with a temperature at least 40° C. higher than the water saturator temperature. Two temperatures 425° C. and 600° C. were selected to represent a MPCC in all solid and solid/liquid state, respectively.

A fuel cell was also constructed with a MPCC (BZY: MC≈50:50 vol %, ~1.0 mm thick) as the electrolyte, $LiNiO_2$-MPCC as the cathode, and NiO as anode. The details on fabrication of $LiNiO_2$-MPCC can be found in previously referenced X. Li, G. Xiao, K. Huang, J. Electrochem. Soc. 158 (2011) B225, incorporated by reference herein. The cell has an effective surface area of 0.8 cm². To prevent the loss of MC during operation, a blocking layer of BZY—NiO (1:1 vol) was applied on the anode side of MPCC and fired at 1400° C. for 4 h prior to MC infiltration. The cell was sealed with a commercial glass power softening at ~670° C. The flow rates of air and $H_2$ (containing 3% $H_2O$) were set to 100 cc/min and 40 cc/min, respectively.

XRD Examination

The XRD examinations confirm a single cubic perovskite structure for BZY sintered at 1500° C. for 5 h and a two-phase mixture of BZY and MC for MPCC fired at 600° C. for 2 h, suggesting no chemical reactions occurred between BZY and MC during fabrication. The MC phase is not obvious from the XRD patterns due to its largely amorphous nature. The phase composition of MPCC after exposure to 3% $H_2O$-air and 3% $H_2O$—$H_2$ remains unchanged, suggesting good chemical stability of MPCC in both oxidizing and reducing atmospheres.

Effect of MC on the Density of BZY

The SEM micrographs of surface and fracture of BZY sintered at 1500° C. are shown in FIGS. 1(a) and (b). A very loose microstructure with poorly connected grains can be seen. In contrast, FIGS. 1(c) and (d) shows a much denser microstructure of BZY filled with MC. Sufficient MC loading in the BZY matrix is the reason for the dense microstructure. The close-to-theoretical open-circuit voltage observed in the following cell testing also confirms the gas tightness of the fabricated MPCC.

Electrical Conductivity of MPCC

Figure 2:
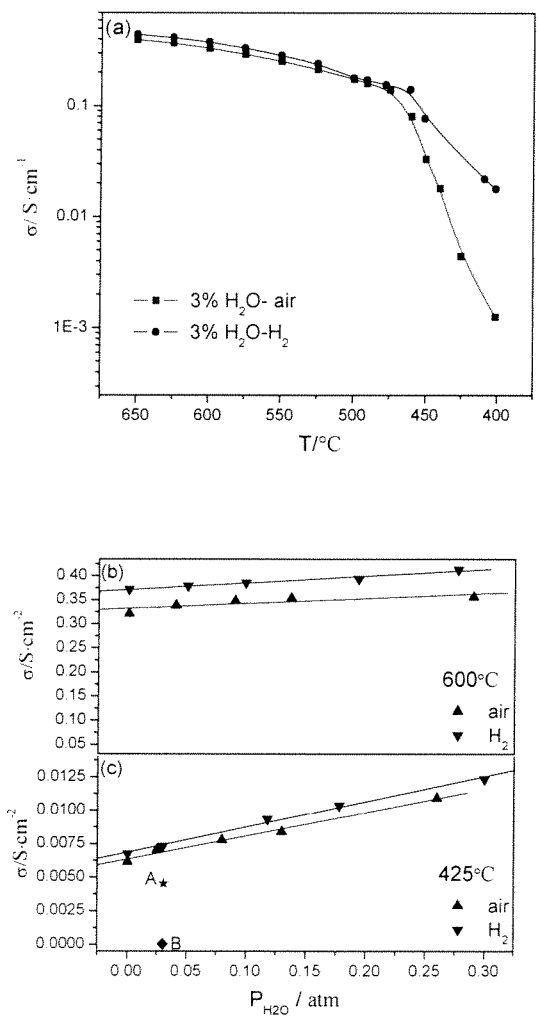
FIG. 2 illustrates plots of effective ionic conductivity (a) as a function of temperature in 3% $H_2O$-air and 3% $H_2O$—$H_2$ and as a function of $P_{H2O}$ at (b) 600° C. and (c) 425° C. in accordance with certain embodiments of the present disclosure. Points A and B are taken from J. Tong, D. Clark, M. Hoban, R. O'Hayre, Solid State Ionics 181 (2010) 496 and H. G. Bohn, T. Schober, J. Am. Ceram. Soc. 83 (2000) 768, respectively, incorporated by reference herein.

The ionic conductivity of MPCC as a function of temperature is shown in FIG. 2(a) for two atmospheres, 3% $H_2O$-air representing for the cathode gas and 3% $H_2O$—$H_2$ representing for the anode gas. The conductivity was only measured during the cooling cycle as there is little effect from thermal cycling on conductivity. Over the entire temperature range studied, the conductivity in 3% $H_2O$—$H_2$ is higher than that in 3% $H_2O$-air, particularly higher at T<450° C. A set of reference conductivity of MPCC at 600° C. is 0.33 S/cm for 3% $H_2O$-air and 0.38 S/cm for 3% $H_2O$—$H_2$, respectively. These values are one or two orders of magnitude higher than pure BZY. The higher conductivity in 3% $H_2O$—$H_2$ infers a likely proton conduction mechanism existing in both solid-state and solid-liquid MPCC. The much higher conductivity of all solid-state MPCC in 3% $H_2O$—$H_2$ and at T<450° C. could further suggest that the major charge carriers become the oxide-related proton defects.

To further understand the underlying ionic conduction mechanism, isothermal conductivity of the MPCC was studied as a function of $P_{H_2O}$ at 600° C. and 425° C., respectively. The results are shown in FIGS. 2(b) and (c), where two trends are observed: 1) ionic conductivities at both temperatures increase with $P_{H_2O}$; 2) conductivity in wet $H_2$ is higher than that in wet air. The results of applying EMPT (Effective Medium Percolation Theory) to a percolating carbonate/oxide composite help to understand the implications of such data: ionic conductivity of the composite is dominated by the oxide-phase when it is in all solid-state and by molten carbonate phase when it is in solid-liquid state. At low temperatures, e.g., 425° C., proton conduction in BZY under $H_2O$ and $H_2$-containing atmospheres can take place via the following defect reactions (using Kroger-Vink notation):

The interactions between $H_2O$ and oxygen vacancies ($V_O^{\cdot\cdot}$) as well as $H_2$ and $V_O^{\cdot\cdot}$ lead to the formation of hydroxyl defects ($OH_O^{\cdot}$), a form of proton in the oxide lattice. This is why the proton conductivity increases with $P_{H_2O}$ and $P_{H_2}$. The double formation of ($OH_O^{\cdot}$) in $H_2O$—$H_2$ atmospheres via reaction (1) and (2) accounts for the observed higher conductivity in wet $H_2$.

However, the fact that conductivity of MPCC at 425° C. is higher than that of dense BZY (e.g., points A and B in FIG. 2(c) cannot be explained by the above defect reactions. The observed enhanced proton conductivity must have different mechanisms. The oxide-produced proton species likely transfers $H^{\cdot}$ to the) neighboring carbonate-ion $(CO_3)_{CO_3}^{x}$, forming new proton conducting species $(HCO_3)_{CO_3}^{\cdot}$. The defect reaction can be expressed by:

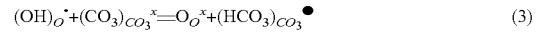

Since the proton-transfer involves two phases, the process must occur along the interface of carbonate and oxide phases. This implies that a coordinated simultaneous proton conduction along the interfacial region could be accountable for the observed higher proton conductivity than the original single-phase BZY. At high temperatures (e.g., T=600° C.), carbonate-ions are the major charge carriers as predicted by the EMPT theory. If the carbonate phase were not conducting protons, the conductivity would be independent of (or much less sensitive to) $P_{H_2O}$ and $P_{H_2}$. This is contradictory to the experimental data shown in FIG. 2(b). To explain the conductivity behavior in FIG. 2(b), a defect reaction involved in the two constituent phases is proposed:

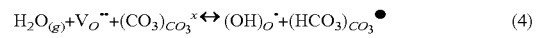

Different from reaction (3), both oxygen ions (vacancies) and carbonate ions are acting as the vehicles for carrying protons as they are both mobile in this temperature range. The simultaneous proton conduction in bulk oxide and extensive proton exchange and transfer along the interface of the two percolating phases contributes to the increased conductivity with $P_{H2O}$. On the other hand, the higher proton conductivity in $H_2$-containing atmosphere, which has also been observed in SDC-(Li/Na)$_2$CO$_3$ system, can be explained by the following defect reaction:

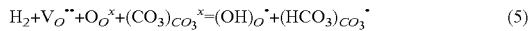

$$H_2 + V_O^{\cdot\cdot} + O_O^x + (CO_3)_{CO_3}^x = (OH)_O^{\cdot} + (HCO_3)_{CO_3}^{\cdot} \quad (5)$$

It is expected from reaction (5) that increasing $P_{H2}$ would increase proton conductivity of MPCC.

Performance of a MPCC-Based Fuel Cell

Figure 3:
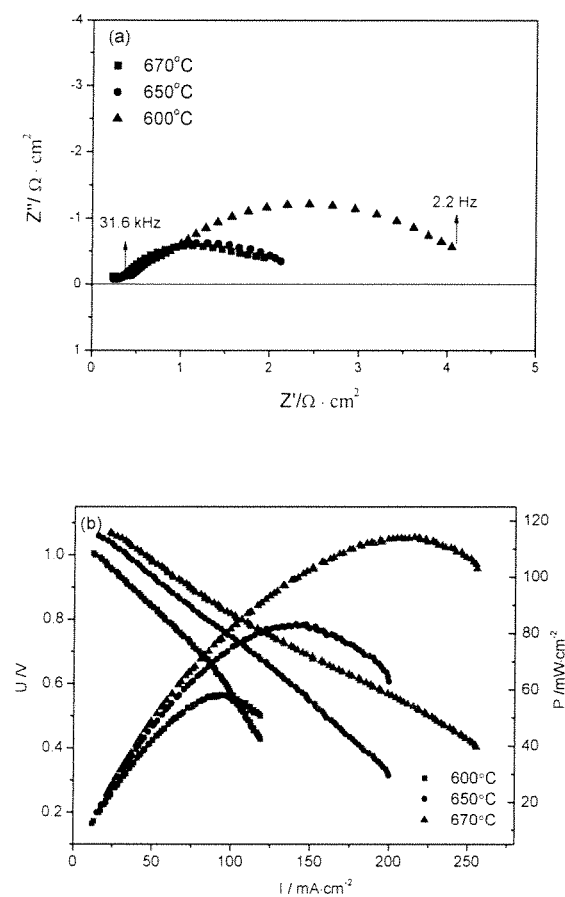
FIG. 3 illustrates (a) AC impedance spectrum (b) V-I and P-I curves of a $LiNiO_2$-MPCC/MPCC/BZY—NiO/Ni cell in accordance with certain embodiments of the present disclosure.

The impedance spectra measured at 600, 650 and 670° C. under OCV condition are shown in FIG. 3. The area specific ohmic resistances determined by the high-frequency intersection with Z'-axis are 0.39, 0.31, 0.26 Ω·cm² for 600, 650 and 670° C., respectively. These values correspond to ionic conductivity of 0.31, 0.39, 0.47 S/cm, which agree very well with those shown in FIG. 2(a). The main resistance contribution comes from electrode polarization as indicated by the diameter of low frequency semicircle. The OCV of the constructed MPCC-based fuel cell is above 1.0 V, suggesting acceptable gas-tightness and negligible electronic conduction. The peak power densities reach 114, 80 and 55 mW/cm² for 670, 650 and 600° C., respectively. However, the overall cell performance degraded slowly with time. The lower OCV at lower temperature seems to signal that the loss of gas tightness may contribute to the performance degradation.

In the interests of brevity and conciseness, any ranges of values set forth in this specification are to be construed as written description support for claims reciting any sub-ranges having endpoints which are whole number values within the specified range in question. By way of a hypothetical illustrative example, a disclosure in this specification of a range of 1-5 shall be considered to support claims to any of the following sub-ranges: 1-4; 1-3; 1-2; 2-5; 2-4; 2-3; 3-5; 3-4; and 4-5.

These and other modifications and variations to the present disclosure can be practiced by those of ordinary skill in the art, without departing from the spirit and scope of the present disclosure, which is more particularly set forth in the appended claims. In addition, it should be understood that aspects of the various embodiments can be interchanged both in whole or in part. Furthermore, those of ordinary skill in the art will appreciate that the foregoing description is by way of example only, and is not intended to limit the disclosure so further described in such appended claims.

What is claimed is:

1. A solid oxide fuel cell comprising:
   an electrolyte comprising a mixed proton and carbonate ion conductor, the mixed proton and carbonate ion conductor including porous yttrium-doped barium zirconate and a eutectic carbonate mixture, the mixed proton and carbonate ion conductor being formed according to a process that includes impregnating the porous yttrium-doped barium zirconate with the eutectic carbonate mixture and densifying the impregnated porous yttrium-doped barium zirconate at a temperature that is less than about 1000° C., the ionic conductivity of the mixed proton and carbonate ion conductor reaching about 0.33 S/cm at 600° C. in 3% $H_2O$/air and reaching about 0.38 S/cm at 600° C. in 3% $H_2O/H_2$.

2. The solid oxide fuel cell as in claim 1, wherein the eutectic carbonate mixture comprises Li2CO3-K2CO3.

3. The solid oxide fuel cell as in claim 1, further comprising an anode and a cathode.

4. The solid oxide fuel cell as in claim 3, wherein the cathode comprises a second mixed proton and carbonate ion conductor.

5. The solid oxide fuel cell as in claim 4, wherein the cathode further comprises LiNiO2.

6. The solid oxide fuel cell as in claim 4, wherein the anode comprises NiO.

7. The solid oxide fuel cell as in claim 6, further comprising an anode blocking layer.

8. The solid oxide fuel cell as in claim 3, further comprising an anode blocking layer.

9. The solid oxide fuel cell as in claim 3, wherein the anode blocking layer comprises yttrium-doped barium zirconate.

10. The solid oxide fuel cell as in claim 3, wherein the anode blocking layer comprises NiO.

* * * * *